United States Patent
Oliveri

(10) Patent No.: US 9,996,541 B2
(45) Date of Patent: Jun. 12, 2018

(54) HASH-BASED MOUNT POINT LOOKUP IN VIRTUAL FILE SYSTEMS

(71) Applicant: Red Hat, Inc., Raleigh, NC (US)

(72) Inventor: Richard Oliveri, Warren, NJ (US)

(73) Assignee: Red Hat, Inc., Raleigh, NC (US)

( * ) Notice: Subject to any disclaimer, the term of this patent is extended or adjusted under 35 U.S.C. 154(b) by 312 days.

(21) Appl. No.: 15/040,676

(22) Filed: Feb. 10, 2016

(65) Prior Publication Data
US 2017/0228390 A1    Aug. 10, 2017

(51) Int. Cl.
G06F 17/30    (2006.01)

(52) U.S. Cl.
CPC .. *G06F 17/30109* (2013.01); *G06F 17/30097* (2013.01); *G06F 17/30221* (2013.01); *G06F 17/30233* (2013.01)

(58) Field of Classification Search
USPC ................................................. 707/829, 831
See application file for complete search history.

(56) References Cited

U.S. PATENT DOCUMENTS

| | | | |
|---|---|---|---|
| 7,860,908 B2 | 12/2010 | Kohl | |
| 8,219,576 B2 | 7/2012 | Brendel | |
| 8,296,398 B2 * | 10/2012 | Lacapra | G06F 17/30206 209/203 |
| 8,762,434 B1 | 6/2014 | Haynes et al. | |
| 9,059,976 B2 | 6/2015 | Lacapra | |
| 2008/0005145 A1 * | 1/2008 | Worrall | G06F 17/30233 |
| 2013/0339319 A1 * | 12/2013 | Woodward | G06F 17/30581 707/692 |
| 2014/0059094 A1 | 2/2014 | Shankar et al. | |
| 2015/0234845 A1 | 8/2015 | Moore et al. | |
| 2015/0293938 A1 | 10/2015 | Hittle | |

OTHER PUBLICATIONS

"Anatomy of the Linux Virtual File System Switch" ibm.com, Aug. 31, 2009, 7 Pages http://www.ibm.com/developerworks/library/l-virtual-filesystem-switch/.
Rusling, David A. "Chapter 9 the File System", tldp.org, 1996-1999, 19 Pages http://www.tldp.org/LDP/tlk/fs/filesystem.html.
"8. The Linux Virtual File System", 13 Pages https://www.win.tue.nl/~aeb/linux/lk/lk-8.html.

* cited by examiner

*Primary Examiner* — Hung T Vy
(74) *Attorney, Agent, or Firm* — Lowenstein Sandler LLP

(57) ABSTRACT

Systems and methods for performing hash-based mount point lookup in virtual file systems. An example method may include: receiving a first character string representing a file name; identifying, within an array of mount point strings, a second character string having a second string length not exceeding a first string length of the first character string; responsive to ascertaining that the first character string comprises the second character string, identifying a file system object associated with a mount point path represented by the second character string; and utilizing the file system object to access a file referenced by the file name.

20 Claims, 5 Drawing Sheets

240 Hash-table

| 252A Mount point path | 254A File system object ID |
|---|---|
| | |
| | |
| | |
| | |
| | |

250A
250B

250N

220 Array of mount point strings

| |
|---|
| |
| 210 Character string |
| |
| |
| |

FIG. 2

HASH-BASED MOUNT POINT LOOKUP IN VIRTUAL FILE SYSTEMS

TECHNICAL FIELD

The present disclosure is generally related to computer systems, and is more specifically related to virtual file systems.

BACKGROUND

A file system is a hierarchy of directories (represented by a directory tree) that may be employed to organize files on a computer system. In the Unix family of operating systems, the root directory located at the very top of this hierarchy contains other directories, inclusive of their respective subdirectories and files.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 schematically illustrates data structures employed by example methods of performing hash-based mount point lookup in virtual file systems, in accordance with one or more aspects of the present disclosure;

DETAILED DESCRIPTION

Figure 1:
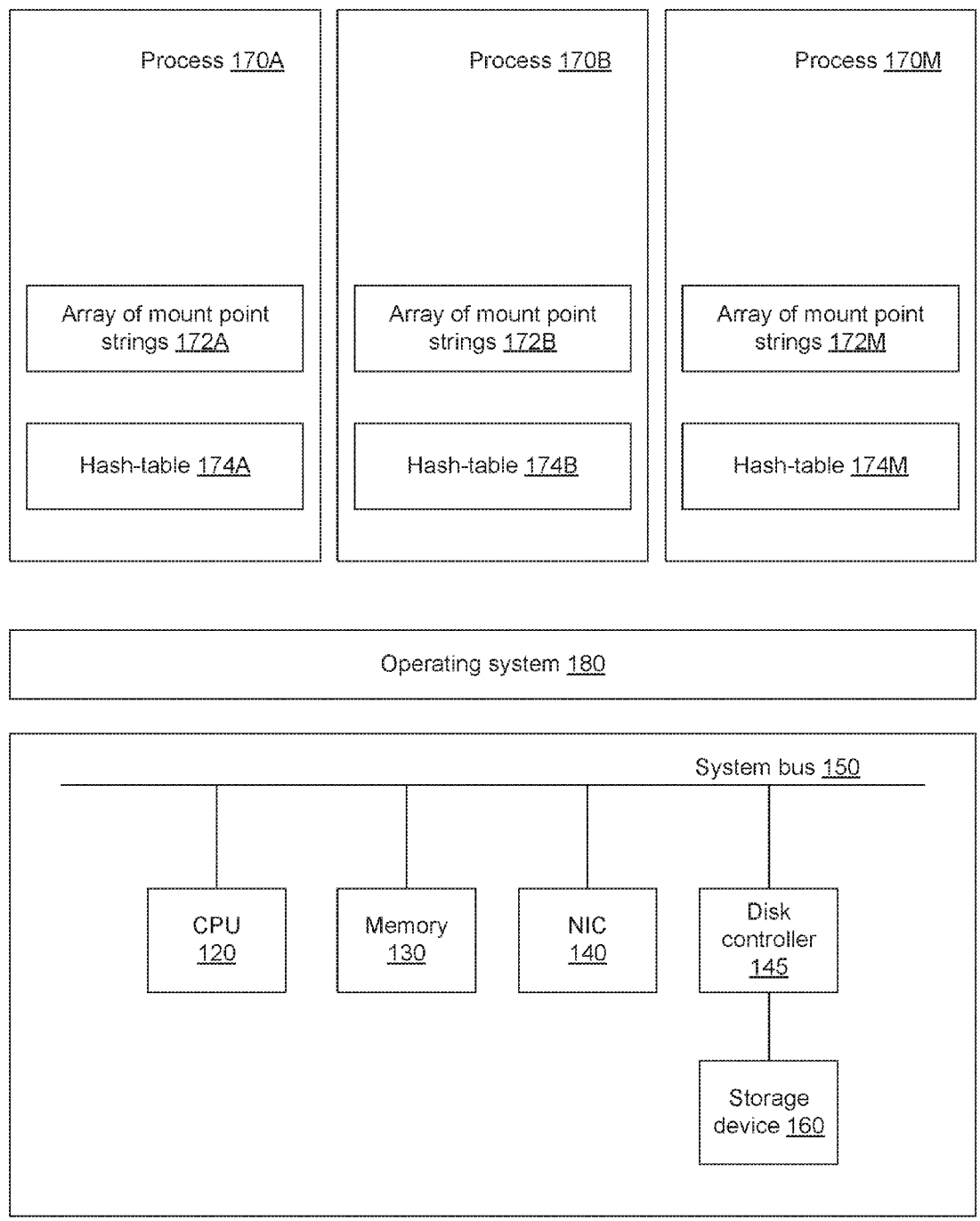
FIG. 1 depicts a high-level component diagram an example computer system operating in accordance with one or more aspects of the present disclosure.

Described herein are methods and systems for performing hash-based mount point lookup in virtual file systems. A virtual file system is an abstraction layer on top of a physical file system. The purpose of a virtual file system is to allow client applications to access different types of file systems (including physical file systems, such as local and network storage devices, as well as pseudo file systems in which the data may be programmatically generated at the runtime rather than retrieved from a storage medium) in a uniform way.

In both physical and virtual file systems, file system objects (such as files and directories) are commonly identified by respective names. A file system object name may be represented by a character string defining the path to the file system object relative to a certain node within the directory tree that represents the file system object hierarchy. Such a character string may comprise a concatenation of one or more directory names delimited by a certain symbol (such as a forward slash) followed by the file name within the lowest level directory. A fully-qualified file system object name defines the path to the file system object from the root of the directory tree. Conversely, a relative file system object name may define a path to the file system object from an arbitrary intermediate node within the directory tree.

A physical or virtual file system may be associated with, or "mounted to," a certain node within the directory tree. Such a node is commonly referenced as a "mount point" for the file system. In other words, a mount point is a directory (possibly an empty one) in a currently accessible file system, to which a newly added file system is mounted (i.e., logically attached). The mount point becomes the root directory of the newly added file system.

In certain implementations, a virtual file system may be supported on a per-process or per-thread basis. In other words, multiple processes or threads within the same process may have access to different virtual file systems, thus providing better flexibility to software developers and/or computer system users.

In a typical operational scenario, responsive to receiving a string representing a file name, a process or a processing thread needs to parse the file name string in order to identify the mount point of the file system in which the file resides. The computational complexity of such parsing may, in common implementations, exponentially depend upon the number of file hierarchy levels.

The present disclosure significantly improves the computational efficiency of file access operations by providing efficient methods and systems for identifying virtual file system mount points by a hash table-based lookup. "Hash table" herein shall refer to a data structure that may be employed to implement an associative array for mapping keys to values. A hash function of a given key value is computed to produce an index into an array of slots, in which the corresponding value may be found.

In accordance with one or more aspects of the present disclosure, when a virtual file system is instantiated, a character string representing the mount point path is inserted into an array of mount point paths, which is sorted by the descending order of the respective string lengths. Then, an entry for the mount point of the newly created virtual file system is created in a hash table mapping mount point paths to identifiers of respective file system objects. The array of mount point paths and the hash table are then used to facilitate the mount point lookup whenever a file operation is performed with respect to a file residing in the virtual file system. The mount point lookup involves traversing the array of the mount point paths until a mount point string is found that has the length not exceeding the length of the given file name. If the file name starts with the identified mount point string, the latter represents the mount point for the given file. The hash table lookup is then performed to identify the file system object associated with the identified mount point, as described in more details herein below.

Therefore, the conventional file name parsing is effectively replaced by traversing the array of mount points and performing the hash table lookup, thus removing the exponential dependence of the computational complexity on the number of levels in the file system hierarchy. Various aspects of the above referenced methods and systems are described in details herein below by way of examples, rather than by way of limitation.

FIG. 1 depicts a high-level component diagram an example computer system operating in accordance with one or more aspects of the present disclosure. Example computer system 100 may comprise one or more processing devices 120 which may be operatively coupled, via a system bus 150, to one or more memory devices 130 and input/output (I/O) devices including one or more network interface controllers (NICs) 140 and one or more disk controllers 145.

"Processing device" or "processor" herein refers to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

A network interface controller (NIC) 140 may implement Open Systems Interconnection (OSI) layer 1 (physical layer) and OSI layer 2 (data link layer), thus providing physical access to a networking medium and a low-level addressing system using media access control (MAC) addresses, in order to allow example computer system 100 to communicate over a wired or wireless network (not shown in FIG. 1).

A disk controller 145 may be employed to facilitate communications of processing devices 120 and/or other components of example computer system 100 with one or more data storage devices 160. "Data storage device" herein shall refer to a memory device, such as a disk, RAID array, EEPROM device, or any other device capable of storing data.

Example computer system 100 may implement one or more physical, virtual, and/or pseudo file systems. In an illustrative example, a physical file system may utilize one or more data storage devices 160 for storing the files and associated metadata. In another illustrative example, a physical file system may utilize one or more network interface controllers to access data storage devices of remote computer systems. In yet another illustrative example, a virtual file system may provide an abstraction on top of a physical file system in order to allow applications to access local and network storage devices transparently for processes and/or processing threads being executed by example computer system 100. In yet another illustrative example, example computer system 100 may implement a pseudo file system, in which the data is programmatically generated at the runtime rather than retrieved from a storage medium.

In an illustrative example, computer system 100 may execute a plurality of processes and/or processing threads 170A-170M managed by an operating system 180. Alternatively, computer system 100 may run one or more virtual machines (not shown in FIG. 1), by executing a software layer, often referred to as "hypervisor," above the hardware and below the virtual machines. The hypervisor may abstract the physical layer, including processors, memory, and I/O devices, and present this abstraction to the virtual machines as virtual devices. A virtual machine may execute a plurality of processes and/or processing threads managed by a guest operating system. Since the differences between a process and a processing thread are operating system-specific and immaterial for the purposes of this disclosure, the term "process" as used herein refers to a single processing thread or to a process comprising one or more processing threads.

As noted herein above, one or more virtual file systems may be supported by example computer system 100 on a per-process or per-thread basis, thus providing different processes with access to different virtual file systems. In accordance with one or more aspects of the present disclosure, for facilitating file operations with respect to files residing in one or more virtual file systems, a process 170 may maintain an array of mount point paths 172 and a hash table 174 mapping mount point paths to identifiers of respective file system objects. While FIG. 1 schematically illustrates each process 170 as maintaining its own copies of the data structures 172 and 174, in various other illustrative examples, the data structures may be shared by one or more processes being executed by example computer system 100.

FIG. 2 schematically illustrates data structures employed by example methods of performing hash-based mount point lookup in virtual file systems, in accordance with one or more aspects of the present disclosure. In certain implementations, a virtual file system may be implemented by a class of an object-oriented programming language. Therefore, an instance of the virtual file system may be created by executing a call to an object creation method of the class implementing the virtual file system.

Responsive to creating the virtual file system (e.g., by instantiating an object of a corresponding class), a character string 210 representing the mount point path may inserted into an array 220 of mount point paths. Character string 210 may comprise a concatenation of one or more directory names delimited by a certain symbol (such as a forward slash). Array 220 of mount point paths may be sorted by the descending order of the respective string lengths, in order to facilitate the subsequent array lookup.

Creating a virtual file system further involves creating a new entry in a hash table 240. Hash table 240 may comprise a plurality of table entries 250A-250N, such that each table entry 250 maps a mount point path 252 to an identifier 254 of a corresponding file system object. In certain implementations, identifier 254 of the file system object may be provided by a handle of a virtual file system instance that has been returned by a call to an object creation method that has created the new instance of the class implementing the virtual file system. Creating a new entry in a hash table 240 involves computing a value of a hash function of the string representing the mount point path. The hash function value is then utilized as an index identifying the newly creating entry in hash table 240.

Array 220 of mount point paths and hash table 240 are then used to facilitate the mount point lookup whenever a file operation is performed with respect to a file residing in the virtual file system. The file may be identified by a character string representing the file name. The character string may comprise a concatenation of one or more directory names delimited by a certain symbol (such as a forward slash) followed by the file name within the lowest level directory. A relative file name defining a path to the file system object from an arbitrary intermediate node within the directory tree may be converted to a fully-qualified file name defining the path to the file system object from the root of the directory tree.

The mount point lookup involves traversing array 220 of the mount point paths until a mount point string is found that has the length not exceeding the length of the fully-qualified file name. If the file name starts with the identified mount point string, the latter represents the mount point for the given file; otherwise, the next mount point string from the array is compared with the file name, until either a mount point string is found which matches a starting substring of the file name or the last entry of the array is reached.

The hash table lookup is then performed to identify the file name object associated with the identified mount point. The hash table lookup involves computing a value of a hash function of the string representing the mount point path. The hash function value is then utilized as an index identifying the corresponding entry in hash table 240. The file system object identified by the hash table entry may then be used to access the file referenced by the given file name and/or other files residing in the virtual file system associated with hash table 240. The identified mount point path may be removed from the file name string, so that the modified file name string would represent the path to the file within the virtual file system. The modified file name may be passed to a file access method of the previously created virtual file system instance.

Figure 3:
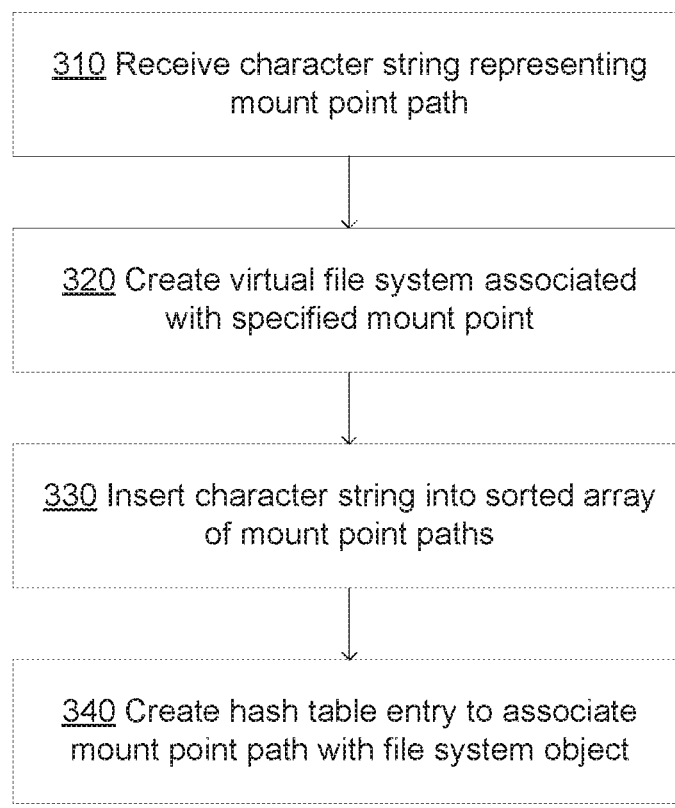
FIG. 3 depicts a flow diagram of an example method of populating the data structures that are employed for hash-based mount point lookup in virtual file systems, in accordance with one or more aspects of the present disclosure.

FIG. 3 depicts a flow diagram of an example method 300 of populating the data structures that are employed for hash-based mount point lookup in virtual file systems, in accordance with one or more aspects of the present disclosure. Method 300 and/or each of its individual functions, routines, subroutines, or operations may be performed by one or more processing devices of the computer system (e.g., computer system 100 of FIG. 1) executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a processing device implementing the method may receive a character string representing a mount point path. The character string may comprise a concatenation of one or more directory names delimited by a certain symbol (such as a forward slash).

At block 320, the processing device may create a virtual file system associated with a mount point identified by the character string. In certain implementations, the virtual file system may be implemented by a class of an object-oriented programming language. Therefore, an instance of the virtual file system may be created by executing a call to an object creation method of the class implementing the virtual file system, as described in more details herein above.

At block 330, the processing device may insert the character string representing the mount point path into an array of mount point paths. The character string may be inserted into the array in a manner maintaining the descending order of the respective string lengths, in order to facilitate the subsequent array lookup, as described in more details herein above.

At block 340, the processing device may create a hash table entry mapping the mount point path to an identifier of a file system object representing the mount point. In an illustrative example, the file system object may be provided by a handle of a virtual file system instance that has been returned by a call to an object creation method that has instantiated an object of the class implementing the virtual file system, as described in more details herein above.

Responsive to completing the operations referenced by block 340, the method may terminate.

Figure 4:
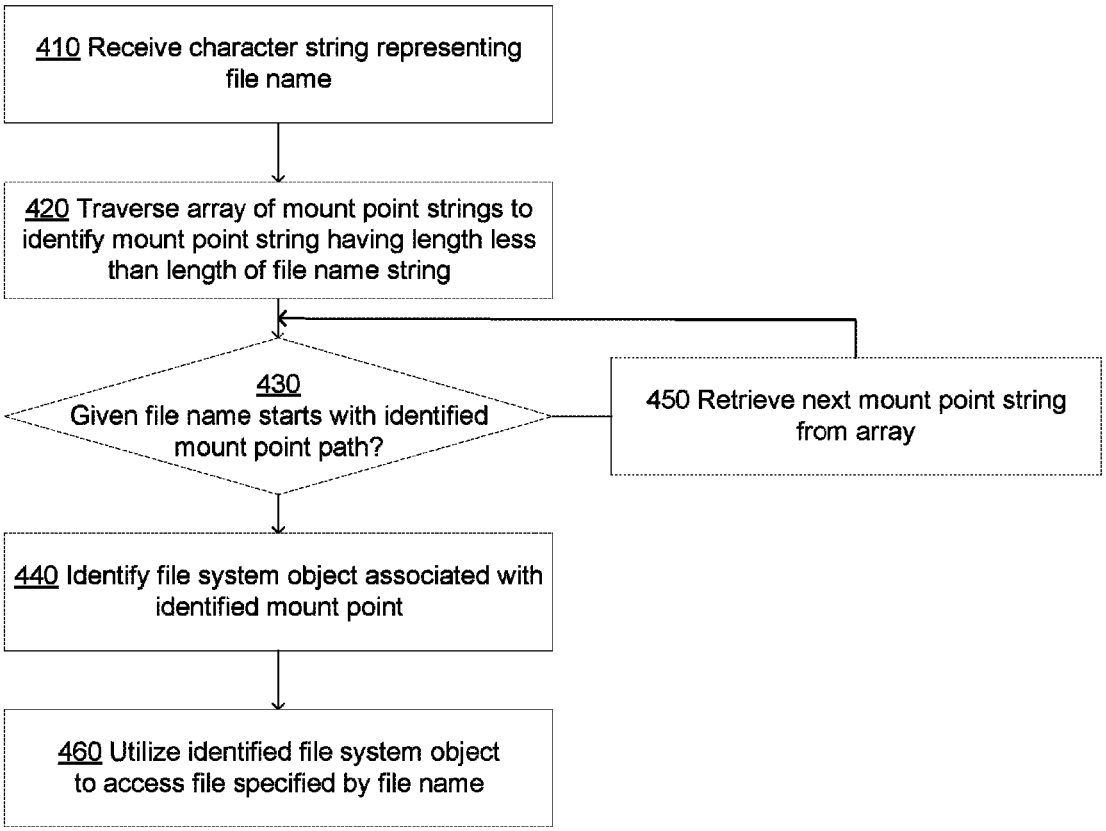
FIG. 4 depicts a flow diagrams of an example method of performing hash-based mount point lookup in virtual file systems, in accordance with one or more aspects of the present disclosure.

FIG. 4 depicts a flow diagram of an example method 400 of performing hash-based mount point lookup in virtual file systems in accordance with one or more aspects of the present disclosure. Method 400 and/or each of its individual functions, routines, subroutines, or operations may be performed by one or more processing devices of the computer system (e.g., computer system 100 of FIG. 1) executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a processing device implementing the method may receive a character string representing a file name. The character string may comprise a concatenation of one or more directory names delimited by a certain symbol (such as a forward slash) followed by the file name within the lowest level directory. A relative file name defining a path to the file system object from an arbitrary intermediate node within the directory tree may be converted to a fully-qualified file name defining the path to the file system object from the root of the directory tree, as described in more details herein above.

At block 420, the processing device may traverse an array of mount point strings to identify a mount point string having the length not exceeding the length of the received file name string.

Responsive to ascertaining, at block 430, that the given file name starts with the identified mount point path, the processing device may, at block 440, identify a file system object associated with the identified mount point path; otherwise, at block 450, the next mount point string from the array is compared with the file name, until either a mount point string is found that matches a starting substring of the file name or the last entry of the array is reached, as described in more details herein above. The processing device may then remove the identified mount point path from the original file name, so that the modified file name string would represent the path to the file within the virtual file system.

At block 460, the processing device may utilize the file system object to access a file referenced by the modified file name. In an illustrative example, the modified file name may be passed to a file access method of the virtual file system instance, as described in more details herein above. Responsive to completing the operations referenced by block 460, the method may terminate.

Figure 5:
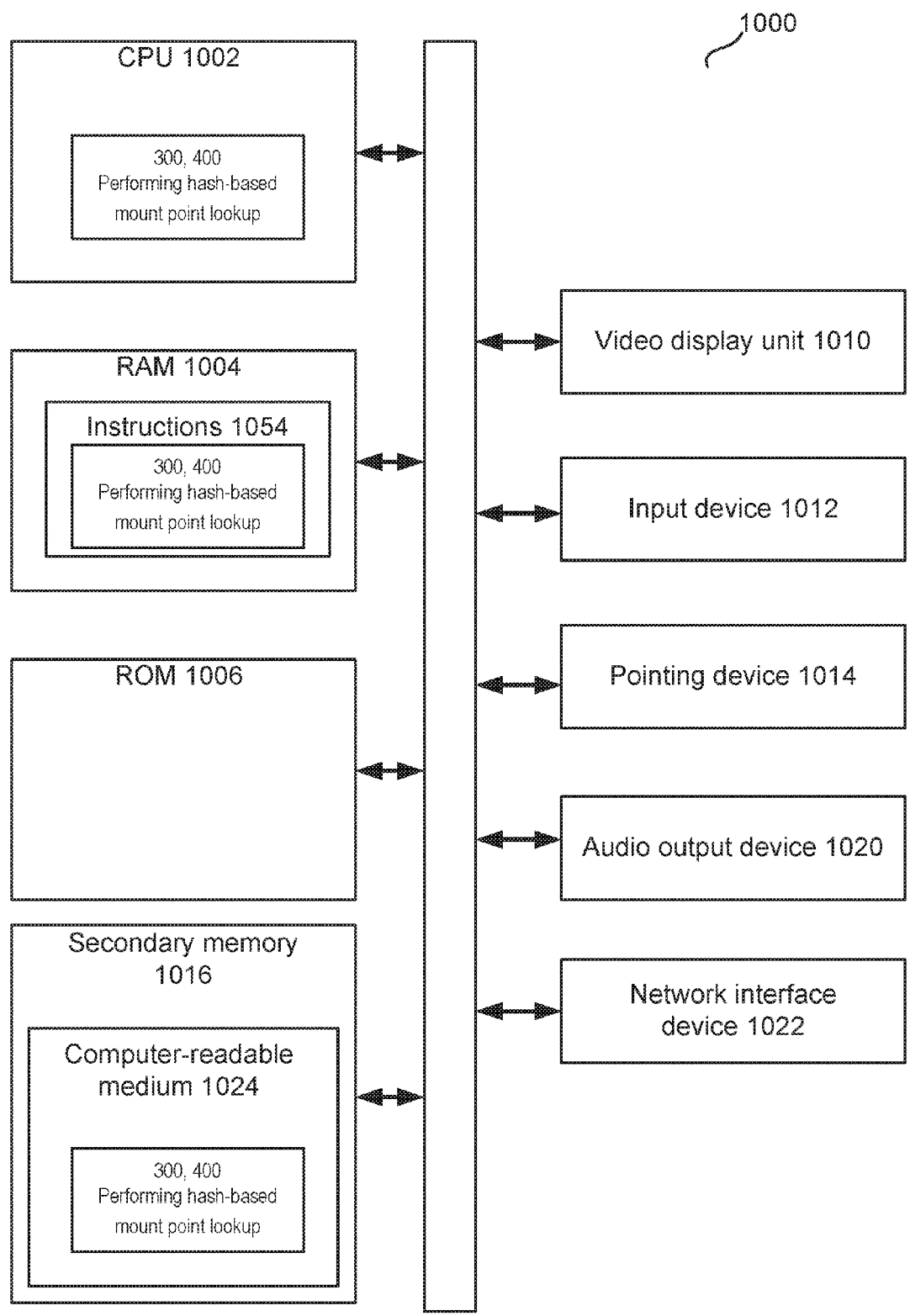
FIG. 5 depicts a high-level component diagram of an example computer system operating in accordance with one or more aspects of the present disclosure.

FIG. 5 depicts a high-level component diagram of an example computer system operating in accordance with one or more aspects of the present disclosure. In various illustrative examples, computer system 1000 may correspond to computer system 100 of FIG. 1.

In one example, computer system 1000 may be connected (e.g., via a network, such as a Local Area Network (LAN), an intranet, an extranet, or the Internet) to other computer systems (e.g., other nodes). Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

Processor 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

In an illustrative example, secondary memory 1016 may include a tangible computer-readable storage medium 1024 on which may be stored instructions 1054 implementing method 300 of populating the data structures that are employed for hash-based mount point lookup in virtual file systems and/or method 400 of performing hash-based mount point lookup in virtual file systems in accordance with one or more aspects of the present disclosure. Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
   receiving, by a processing device, a first character string representing a file name;
   identifying, within an array of mount point strings, a second character string having a second string length not exceeding a first string length of the first character string;
   responsive to ascertaining that the first character string comprises the second character string, identifying a file system object associated with a mount point path represented by the second character string; and
   utilizing the file system object to access a file referenced by the file name.

2. The method of claim 1, wherein identifying the file system object associated with the mount point path further comprises looking up a hash table comprising a plurality of mappings of mount point paths to respective file system object identifiers.

3. The method of claim 1, wherein the file system object is identified by a handle of a virtual file system associated with a mount point referenced by the mount point path.

4. The method of claim 1, wherein utilizing the file system object to access the file further comprises instantiating a virtual file system associated with a mount point referenced by the mount point path.

5. The method of claim 1, wherein the mount point path references a directory within a file system accessible by a process being executed by the processing device.

6. The method of claim 1, further comprising:
creating an instance of a virtual file system associated with a mount point identified by the mount point path;
inserting the second character string into the array of mount point strings, in a descending order of respective mount point string lengths; and
associating the mount point path with the file system object.

7. The method of claim 6, wherein associating the mount point path with the file system object further comprises creating an entry in a hash table comprising a plurality of mappings of mount point paths to respective file system object identifiers.

8. A system, comprising:
a memory; and
a processing device, operatively coupled to the memory, the processing device to:
receive a character string representing a mount point path;
create an instance of a virtual file system associated with a mount point identified by the character string;
insert the character string into an array of mount point strings, in a descending order of respective mount point string lengths; and
associate the mount point path with a file system object representing the mount point.

9. The system of claim 8, wherein to associate the mount point path with the file system object, the processing device is further to create an entry in a hash table comprising a plurality of mappings of mount point paths to respective file system object identifiers.

10. The system of claim 8, wherein the file system object is identified by a handle of the virtual file system.

11. The system of claim 8, wherein the processing device is further to:
receive a first character string representing a file name;
identify, within the array of mount point strings, a second character string having a second string length not exceeding a first string length of the first character string;
responsive to ascertaining that the first character string comprises the second character string, identify the file system object associated with the mount point path represented by the second character string; and
utilize the file system object to access a file referenced by the file name.

12. The system of claim 10, wherein to identify the file system object, the processing device is further to look up the hash table.

13. The system of claim 8, wherein to access the file, the processing device is further to instantiate a virtual file system.

14. A non-transitory computer-readable storage medium comprising executable instructions that, when executed by a processing device, cause the processing device to:
receive, by the processing device, a first character string representing a file name;
identify, within an array of mount point strings, a second character string having a second string length not exceeding a first string length of the first character string;
responsive to ascertaining that the first character string comprises the second character string, identify a file system object associated with a mount point path represented by the second character string; and
utilize the file system object to access a file referenced by the file name.

15. The non-transitory computer-readable storage medium of claim 14, wherein executable instructions causing the processing device to identify the file system object associated with the mount point path further comprise executable instructions causing the processing device to look up a hash table comprising a plurality of mappings of mount point paths to respective file system object identifiers.

16. The non-transitory computer-readable storage medium of claim 14, wherein the file system object is identified by a handle of a virtual file system associated with a mount point referenced by the mount point path.

17. The non-transitory computer-readable storage medium of claim 14, wherein executable instructions causing the processing device to access the file further comprise executable instructions causing the processing device to instantiate a virtual file system associated with a mount point referenced by the mount point path.

18. The non-transitory computer-readable storage medium of claim 14, wherein the mount point path references a directory within a file system accessible by a process being executed by the processing device.

19. The non-transitory computer-readable storage medium of claim 14, further comprising executable instructions causing the processing device to:
create an instance of a virtual file system associated with a mount point identified by the mount point path;
insert the second character string into the array of mount point strings, in a descending order of respective mount point string lengths; and
associate the mount point path with the file system object.

20. The non-transitory computer-readable storage medium of claim 19, wherein executable instructions causing the processing device to associate the mount point path with the file system object further comprise executable instructions causing the processing device to create an entry in a hash table comprising a plurality of mappings of mount point paths to respective file system object identifiers.

* * * * *